United States Patent [19]
Inoue

[11] Patent Number: 5,301,933
[45] Date of Patent: Apr. 12, 1994

[54] SAMPLE MOVING DEVICE

[75] Inventor: Mitsuru Inoue, Yokohama, Japan

[73] Assignee: Canon Kabushiki Kaisha, Tokyo, Japan

[21] Appl. No.: 71,225

[22] Filed: Jun. 2, 1993

Related U.S. Application Data

[63] Continuation of Ser. No. 961,040, Oct. 14, 1992, abandoned, which is a continuation of Ser. No. 659,088, Feb. 22, 1991, abandoned.

[30] Foreign Application Priority Data

Feb. 27, 1990 [JP] Japan ................................. 2-047850

[51] Int. Cl.$^5$ .............................................. B23Q 3/18
[52] U.S. Cl. ......................................... 269/73; 269/71; 269/60
[58] Field of Search ........................ 269/71, 73, 45, 58, 269/56, 60; 369/44.16

[56] References Cited

U.S. PATENT DOCUMENTS 4,482,986 11/1984 Noda et al. ...................... 369/44.16
4,887,804 12/1989 Ohtsuka ............................... 269/73

FOREIGN PATENT DOCUMENTS 59-145527 8/1984 Japan .

Primary Examiner—Bruce M. Kisliuk
Assistant Examiner—Eileen P. Morgan
Attorney, Agent, or Firm—Fitzpatrick, Cella, Harper & Scinto

[57] ABSTRACT

A moving device includes a moving table for mounting an object thereon and for moving the object, a guiding mechanism for regulating the movement of the moving table, a driving mechanism for generating a force to move the moving table, and a transmission mechanism for transmitting the driving force to the moving table. The transmission mechanism includes at least one set of parallel leaf springs having an oscillation-damping material disposed therebetween.

7 Claims, 4 Drawing Sheets

SAMPLE MOVING DEVICE

This application is a continuation of application Ser. No. 07/961,040, filed Oct. 14, 1992, which is a continuation of application Ser. No. 07/659,088, filed Feb. 22, 1991, now both abandoned.

BACKGROUND OF THE INVENTION

1. Field of the Invention

This invention relates to a moving device which is used in a measuring apparatus, a semiconductor printing apparatus, a precision machine tool or the like.

2. Description of the Prior Art

In a conventional precision sample moving device, in order to absorb the whirling of a feed screw during revolution, a feed-screw nut has been coupled to a moving platform via parallel leaf springs, as disclosed, for example, in Japanese Patent Application Public Disclosure (Kokai) No. 59-145527 (1984).

The above-described conventional device, however, has the disadvantage that the attenuation of oscillation when the feed-screw nut oscillates is inferior. As a result, the conventional device has, for example, the following disadvantages:

(1) When performing a high-speed positioning operation, the nut oscillates due to the whirling of the feed screw. The oscillation is transmitted to the sample platform to deteriorate positioning time and positioning accuracy.

(2) When an external force is applied to the sample platform, the feed screw and the nut oscillate. The oscillation is transmitted to the sample platform to deteriorate positioning time and positioning accuracy.

SUMMARY OF THE INVENTION

The present invention has been made in consideration of the above-described problems.

It is an object of the present invention to provide a high-speed and highly accurate moving device.

This object is accomplished, according to the present invention, by interposing an oscillation-damping material between parallel leaf springs which connect a feed screw to a platform.

In accordance with one aspect of the invention, a moving device comprises a moving table for mounting an object thereon and for moving the object, a guiding mechanism in contact with the moving table for guiding the movement thereof and a driving mechanism for generating a driving force to move the moving table. Transmission means transmits the driving force to the moving table. The transmission means includes at least one set of parallel leaf springs with an oscillation-damping material disposed therebetween.

DETAILED DESCRIPTION OF THE PREFERRED EMBODIMENTS

Figure 1:
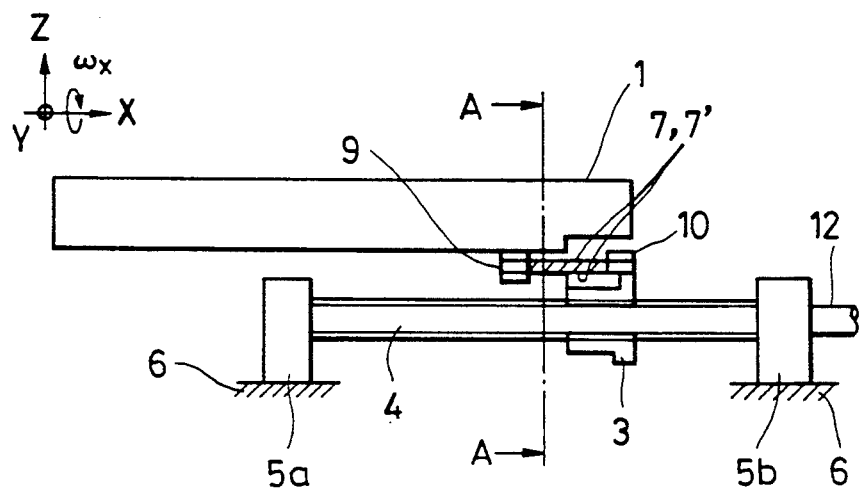
FIG. 1 is a vertical cross-sectional view of a device according to a first embodiment of the present invention.

The present invention will now be explained with reference to the preferred embodiments shown in the drawings.

Figure 2:
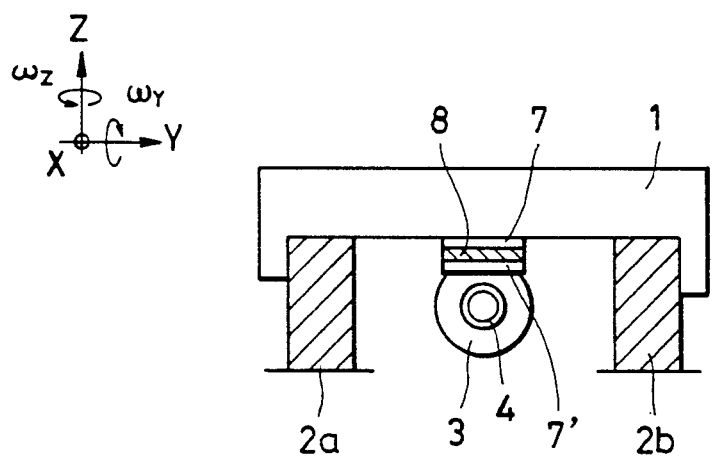
FIG. 2 is a cross-sectional view taken along line A—A of FIG. 1.

FIG. 1 is a vertical cross-sectional view of an embodiment of the present invention. FIG. 2 is a cross-sectional view taken along line A—A of FIG. 1. In FIGS. 1 and 2, there are shown a parallel-moving table 1, and a pair of guides 2a and 2b. The lower surface of the parallel-moving table 1 is movably supported in the direction X by the guides 2a and 2b via a lubricating layer. The movement of the parallel-moving table 1 in the directions Y and Z is regulated by the guides 2a and 2b. A ball nut or feed nut 3 meshes with a ball screw or feed screw 4. A pair of bearing housings 5a and 5b receive bearings which hold two end portions of the ball screw or feed screw 4, and are fixedly mounted on a base 6.

Leaf springs 7 and 7' constitute a pair of parallel leaf springs. Viscoelastic rubber 8 is interposed between the leaf springs 7 and 7'. The length in the direction X, the thickness in the direction Z, the width in the direction Y and the number of leafs to be provided in parallel of the springs 7 and 7' are determined so that they do not yield even when the load including the moving table 1 and an apparatus mounted thereon is applied in the vertical direction (the direction Z). In particular, the width (in the direction Y) may be sufficiently wider than the thickness (in the direction Z) in order to increase the torsional rigidity of the springs. The shape of the springs may be changed in various manners.

A first fixing member 9 horizontally (in the direction X) holds the leaf springs 7 and 7' in a substantially parallel state, and secures them to the lower surface of the parallel-moving table 1. A second fixing member 10 holds the other ends of the leaf springs 7 and 7' which are separate from the first fixing member 9 by a predetermined distance in the direction X, and secures them to a side portion of the nut 3. One end of the ball screw or feed screw 4 is coupled to or provided as one body with a rotation shaft 12 which is rotatably driven manually or by an electric motor.

In the above-described configuration, if the ball screw or feed screw 4 is rotated, the nut 3 fed by the screw 4 is moved in the horizontal direction (the direction X). The parallel-moving table 1 is pulled or pressed by the leaf springs 7 and 7', and is moved in the direction X while being guided by the guides 2a and 2b. At that time, the pitching (the rotational movement in the direction wy) of the nut 3 which is generated when the rotational movement of the screw 4 is converted into the linear movement of the nut 3 is absorbed by the parallel leaf springs 7 and 7'. Since the viscoelastic rubber 8 is interposed between the leaf springs 7 and 7', a shearing force is exerted on the viscoelastic rubber 8 when the displacement of the nut 3 is absorbed by the leaf springs 7 and 7'. At that time, the attenuation effect of the vibration of the nut 3 can be obtained due to the internal friction and viscous resistance of the viscoelastic rubber 8, and the parallel-moving table 1 is positioned without receiving the vibration from the nut 3. The foregoing embodiment is an example wherein the pitching (the rotational movement in the direction wy) characteristics are improved.

Figure 3:
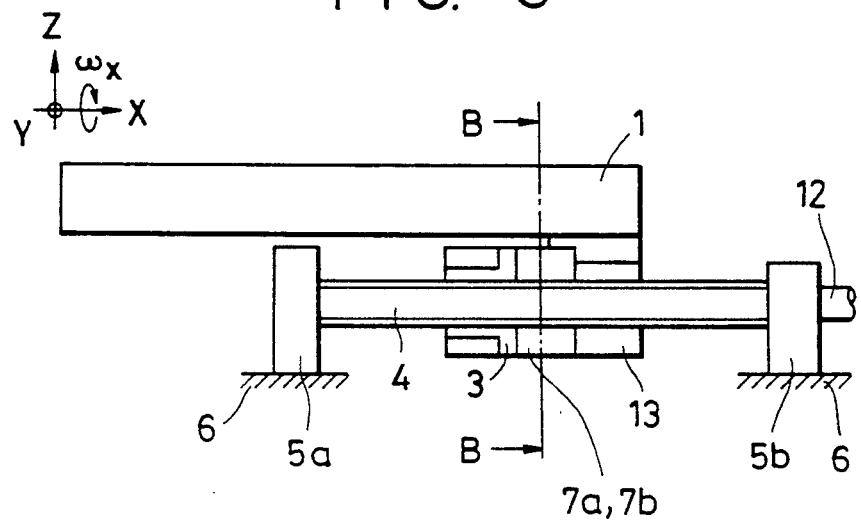
FIG. 3 is a vertical cross-sectional view of a device according to a second embodiment of the present invention.
Figure 4:
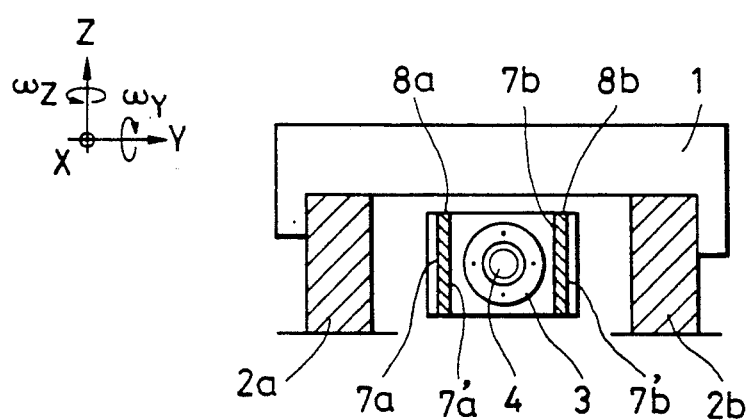
FIG. 4 is a cross-sectional view taken along line B—B of FIG. 3.

An embodiment shown in FIG. 3 is an example wherein the yawing (the rotational movement in the direction wz) characteristics are improved. FIG. 4 is a cross-sectional view taken along line B—B of FIG. 3. The same numerals as in the foregoing embodiment indicate members having substantially the same functions. In FIGS. 3 and 4, a ball nut or feed nut 3 includes mounting portions for parallel leaf springs at both sides in the direction Y. Leaf springs 7a, 7'a, 7b and 7'b are the same as in the foregoing embodiment, and constitute two pairs of leaf springs 7a and 7'a, and 7b and 7'b. Viscoelastic rubbers 8a and 8b are interposed between the leaf springs 7a and 7'a, and 7b and 7'b, respectively, together with respective spacers (not shown).

A saddle-like member 13 including a notch which strides over the ball screw or feed screw 4 is secured to the lower surface of the parallel-moving table 1. The parallel leaf springs 7a and 7'a, and 7b and 7'b are secured to both sides of the saddle-like member 13 so as to be subtantially parallel to the plane XZ which is perpendicular to the horizontal plane.

In the above-described configuration, when the ball screw or feed screw 4 is rotated, the parallel-moving table 1 is pushed or pulled by the parallel leaf springs 7a and 7b, and 7'a and 7'b, and is moved in the direction X while being guided by the guides 2a and 2b. During this movement, the yawing is absorbed by the parallel leaf springs. At that time, the attenuation effect of the vibration can be obtained by the viscoelastic rubbers 8a and 8b, and the parallel-moving table 1 is positioned without receiving the vibration from the nut 3, as in the foregoing embodiment.

Figure 5:
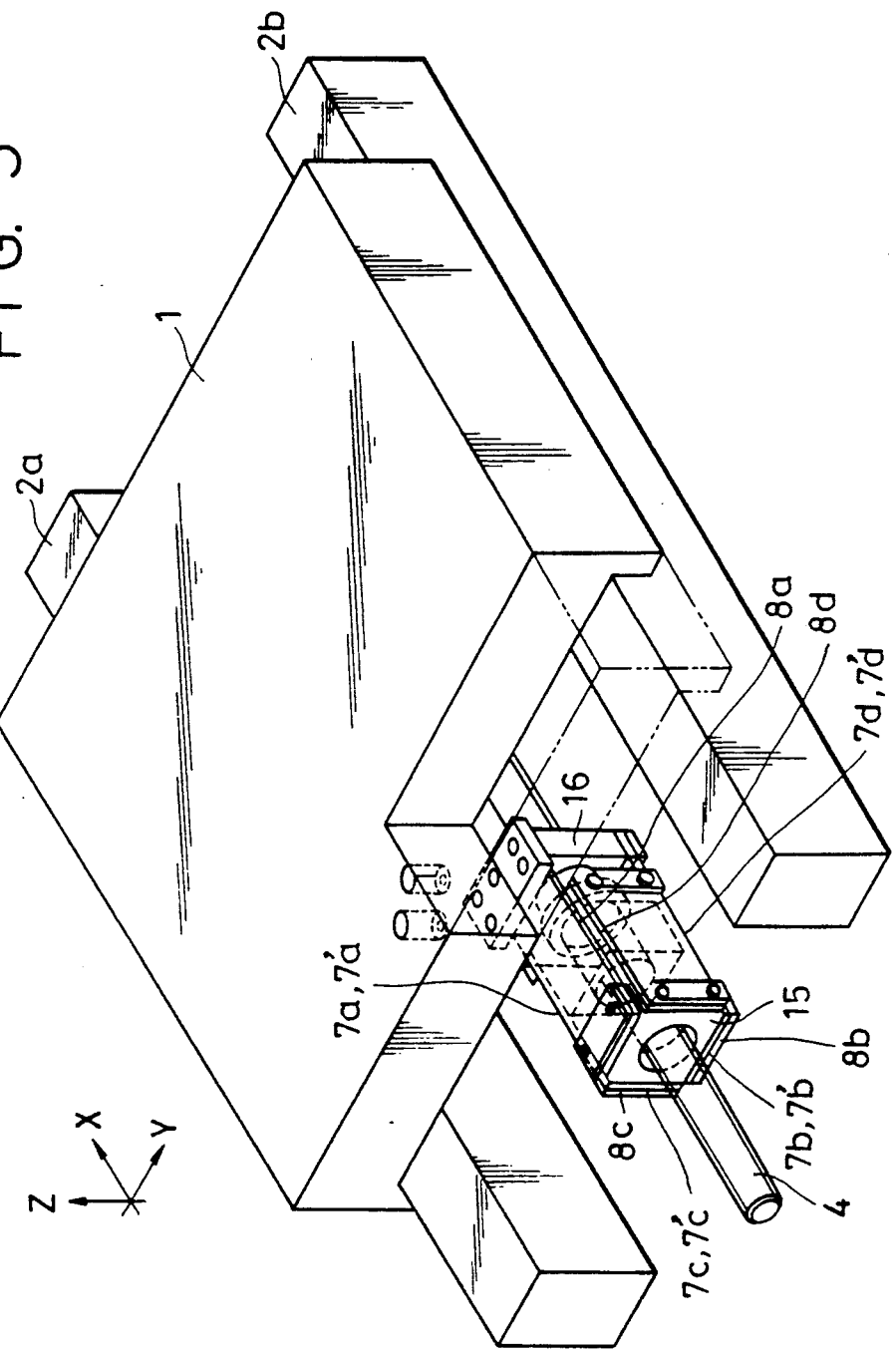
FIG. 5 is a perspective view of a device according to a third embodiment of the present invention.
Figure 6:
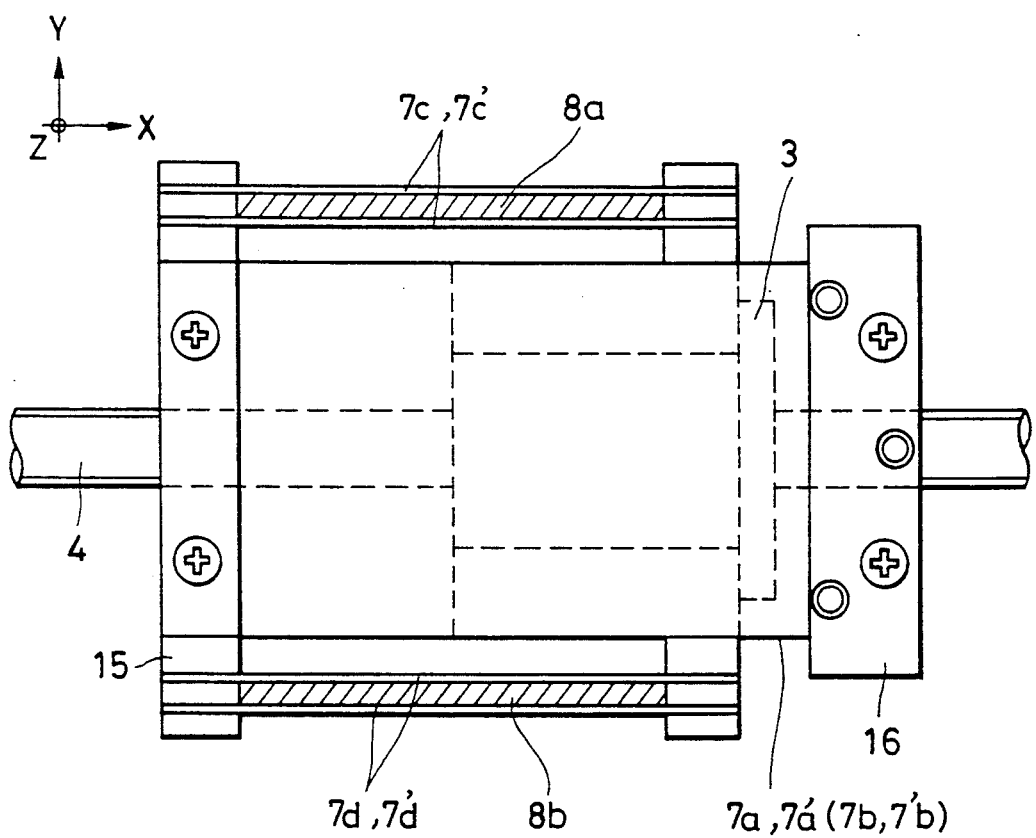
FIG. 6 is a diagram showing a principal part of FIG. 5.

A third embodiment shown in FIGS. 5 and 6 is an example wherein both the pitching and yawing characteristics are improved. In FIGS. 5 and 6, members having substantially the same functions as in the foregoing embodiments are indicated by the same numerals.

In FIGS. 5 and 6, on upper and lower (in the direction Z) surfaces and left and right (in the direction Y) surfaces of a relay block 15 are fixed parallel leaf springs 7a and 7'a, 7b and 7'b, 7c and 7'c, and 7d and 7'd, respectively. The relay block 15 has a circular opening at its center through which the ball screw or feed screw 4 freely passes. A mounting block 16 for the parallel leaf springs has a circular opening at its center through which the ball screw or feed screw 4 freely passes, and is secured to the lower surface of the parallel-moving table 1.

One ends of the parallel leaf springs 7a and 7'a, and 7b and 7'b which extend in the horizontal planes (parallel to plane XY) and sandwich the feed screw 4 from above and below (in the direction Z) are fixed to the upper and lower surfaces of the mounting block 16, and the other ends thereof are fixed to the upper and lower surfaces of the relay block 15 as described above. Viscoelastic rubbers 8a and 8b are interposed between the parallel leaf springs 7a and 7'a, and 7b and 7'b, respectively.

One ends of the parallel leaf springs 7c and 7'c, and 7d and 7'd which extend in the planes (parallel to plane XZ) perpendicular to the horizontal plane and sandwich the feed screw 4 from the right and left (in the direction Y) are fixed to the right and left surfaces of the nut 3, and the other ends thereof are fixed to the right and left surfaces of the relay block 15. Viscoelastic rubbers 8c and 8d are interposed between the parallel leaf springs 7c and 7'c, and 7d and 7'd, respectively.

The function of these composite parallel leaf springs interposing the viscoelastic rubbers is to absorb the horizonal component of the whirling of the ball screw or feed screw 4 and the nut 3 by the right and left parallel leaf springs, to absorb the vertical component by the upper and lower parallel leaf springs, to attenuate the vibration by the viscoelastic rubbers, and to transmit only the feed force in the axial direction to the parallel-moving table 1.

While the foregoing embodiments illustrate the tables each moving in one direction, an X-Y moving table may be provided if two of the above-described tables are superposed one over the other so that the directions of the feed screws are orthogonal. In the X-Y moving table, if the lower table is moved, a force to oscillate the feed screw and nut of the upper table is generated. In the present embodiments, however, since such oscillation is also attenuated, a high-speed and highly accurate positioning operation is possible even in the X-Y moving table.

In place of the viscoelastic rubber described in the foregoing embodiments, viscous oil may be used in a space between a pair of parallel leaf springs by providing the space so as to balance the liquid with its surface tension. Polymer resin may also be used. Furthermore, the parallel leaf springs may be made of a magnetic material, and a magnetic fluid may be used in place of the viscoelastic rubber. By using the magnetic fluid, and injecting it after assembling the parallel leaf springs, the assembling operation becomes easier. In this case, it is desirable to constitute the parallel leaf springs by a magnetic material. In place of configuring the coupling mechanism with the parallel leaf springs and viscoelastic rubber, an oscillation-damping steel plate which has the configuration equivalent to the combination of the parallel leaf springs and viscoelastic rubber by itself may be used for the coupling mechanism.

Although the feed screw for converting the rotational movement into the linear movement has been described as the transmission mechanism, a linear feed mechanism may also be used wherein the driving mechanism and the transmission mechanism are combined, such as a linear motor, an air cylinder, a hydraulic cylinder, a solenoid or the like.

As explained above, in the present invention, parallel leaf springs for absorbing the displacement in directions other than the direction of the movement of a feedscrew nut are provided, and an oscillation-damping material is interposed between the parallel leaf springs. Hence, it is possible to improve the position deviation of a parallel-moving table and the characteristics of yawing and/or pitching caused by the whirling of the feed screw, and to improve positioning accuracy and positioning time. Furthermore, even if an oscillating force is applied to the parallel-moving table, it is possible to provide an apparatus having little displacement.

What is claimed is:

1. A moving device, comprising:
   a movable table;
   a driving mechanism having a screw and a nut for converting a rotational movement to a linear movement;
   at least one set of parallel leaf springs for connecting said movable table with said nut, said parallel leaf springs absorbing a displacement of said nut relative to said movable table in a direction other than the movement direction of said nut; and
   an oscillation-damping material being disposed between said parallel leaf springs and damping displacement of said nut relative to said movable table in a direction other than the movement direction of said nut.

2. A moving device according to claim 1, wherein said oscillation-damping material is a viscoelastic rubber.

3. A moving device according to claim 1, wherein said oscillation-damping material is an oil.

4. A moving device according to claim 1, wherein said oscillation-damping material is a polymer resin.

5. A moving device according to claim 1, wherein said parallel leaf springs are made of a magnetic material and said oscillation-damping material is a magnetic fluid.

6. A moving device according to claim 1, wherein two sets of parallel leaf springs are provided, and said movable table moves in a reference moving plane extending in a direction parallel to a longitudinal axis of said movable table, with said two sets being disposed in parallel planes with respect to each other and orthogonal to the moving plane 7. A moving device according to claim 1, wherein four sets of parallel leaf springs are provided and said movable table moves in a reference moving plane extending in a direction parallel to a longitudinal axis of said movable table, with first and second sets being disposed in parallel planes with respect to each other and orthogonal to the moving plane of said moving table, and third and fourth sets being disposed in parallel planes with respect to each other and parallel to the moving plane.

* * * * *

UNITED STATES PATENT AND TRADEMARK OFFICE
CERTIFICATE OF CORRECTION

PATENT NO. : 5,301,933
DATED : April 12, 1994
INVENTOR(S) : Inoue

It is certified that error appears in the above-indentified patent and that said Letters Patent is hereby corrected as shown below:

COLUMN 6:

Line 4, "plane" should read --plane.--.

Signed and Sealed this

First Day of November, 1994

Attest:

BRUCE LEHMAN

*Attesting Officer*     *Commissioner of Patents and Trademarks*